US012665376B2

(12) United States Patent
    Zajdman

(10) Patent No.: US 12,665,376 B2
(45) Date of Patent: Jun. 23, 2026

(54) LASER SYSTEM

(71) Applicant: Avigdor Zajdman, Rehovot (IL)

(72) Inventor: Avigdor Zajdman, Rehovot (IL)

( * ) Notice: Subject to any disclaimer, the term of this patent is extended or adjusted under 35 U.S.C. 154(b) by 22 days.

(21) Appl. No.: 16/766,672

(22) PCT Filed: Nov. 23, 2018

(86) PCT No.: PCT/IB2018/059242
    § 371 (c)(1),
    (2) Date: May 22, 2020

(87) PCT Pub. No.: WO2019/102402
    PCT Pub. Date: May 31, 2019

(65)            Prior Publication Data
    US 2020/0388979 A1      Dec. 10, 2020

(51) Int. Cl.
    *H01S 3/08*       (2023.01)
    *G02B 5/00*       (2006.01)
    *H01S 3/06*       (2006.01)
    *H01S 3/07*       (2006.01)
    *H01S 3/08045*    (2023.01)
    *H01S 3/081*      (2006.01)

(52) U.S. Cl.
    CPC .......... *H01S 3/08059* (2013.01); *G02B 5/001* (2013.01); *H01S 3/0604* (2013.01); *H01S 3/07* (2013.01); *H01S 3/08063* (2013.01); *H01S 3/0813* (2013.01); *H01S 3/0818* (2013.01); *H01S 3/08045* (2013.01); *H01S 3/08081* (2013.01)

(58) Field of Classification Search
    CPC ..... G02B 5/001; H01S 3/08059–08068; H01S 3/0604; H01S 3/08081; H01S 3/0818; H01S 3/08063; H01S 3/0813–0817
    See application file for complete search history.

(56)            References Cited

U.S. PATENT DOCUMENTS 3,808,552 A  *  4/1974  Baues ..................... H01S 3/101
                                                          372/24
    4,164,366 A     8/1979  Sziklas et al.
    4,598,408 A     7/1986  O'Keefe
    5,058,123 A  * 10/1991  Yasui .................. H01S 3/08081
                                                          372/99

(Continued)

FOREIGN PATENT DOCUMENTS

JP      2010021486 A  *  1/2010  ........... H01S 3/0813
    WO   WO-03043144 A2  *  5/2003  ........... H01S 3/0632

OTHER PUBLICATIONS

Endo, M. et al., "Analysis of an Optical Resonator Formed by a Pair of Specifically Shaped Axioms," j. Opt Soc. Am. A, vol. 29, No. 4 / Apr. 2012 / J. Opt. Soc. Am. A.

(Continued)

*Primary Examiner* — Sean P Hagan
(74) *Attorney, Agent, or Firm* — Reches Patents

(57)            ABSTRACT

An optical configuration including axiconical elements that serve as parts of a resonator or an optical chain of an amplifier for an active laser volume with a large transverse dimension. The system may include a single-fold or multiple-folds axiconical elements. One of the system's advantages is providing the means to produce, even with a stable resonator, a high-quality and well-controlled beam, utilizing efficiently a wide active laser medium.

24 Claims, 12 Drawing Sheets

(56) References Cited

U.S. PATENT DOCUMENTS

| | | | |
|---|---|---|---|
| 5,260,964 A * | 11/1993 | Morin | H01S 3/08063 |
| | | | 372/99 |
| 5,506,858 A * | 4/1996 | Takenaka | H01S 3/08059 |
| | | | 372/19 |
| 5,604,592 A | 2/1997 | Kotidis | |
| 5,638,396 A | 6/1997 | Klimek | |
| 5,648,980 A * | 7/1997 | Seguin | H01S 3/0315 |
| | | | 372/34 |
| 6,442,187 B1 * | 8/2002 | Dutov | H01S 3/0315 |
| | | | 372/101 |
| 2002/0172253 A1 * | 11/2002 | Vetrovec | H01S 3/042 |
| | | | 372/95 |
| 2010/0309556 A1 | 12/2010 | Dewitt | |
| 2020/0388979 A1 | 12/2020 | Zajdman | |

OTHER PUBLICATIONS

Http://www.SintecOptronics.com http://www.SintecOptronics.com.
sg sales@SintecOptronics.com Sep. 2023.

* cited by examiner

Prior art

Prior art

M1 101                                                                          M2 102

Output beam

M1 101

D1 11

M3
103

M2 102

Output beam

100

MRF1 MRF2

LASER SYSTEM

CROSS REFERENCE

This application claims priority from Israeli Patent serial number 255894 filing date 26 Nov. 2017 which is incorporated herein by reference.

BACKGROUND

Lasers with large transverse dimensions are being used in a variety of applications. Prime examples are the solid state disc lasers, the UV excimer lasers etc. Extracting a high quality beam out of this kind of lasers is intrinsically difficult due to the high Fresnel Number implied by the wide transverse dimension. To-date this has been accomplished either by using quite complex resonators, or was not possible.

One way of reducing the Fresnel Number is by constructing a low-diameter resonator and passing the beam through the active volume multiple times side-by-side, filling the cross-section area as effectively as possible and creating a long axial dimension. Such multiple-element resonator is prone to mechano-optical instabilities. It also does not utilize the full active gain volume.

Another way of reducing the Fresnel Number is constructing an unstable resonator—USR—with a suitable "Equivalent Fresnel Number" and high output coupling. This is not always possible due to the limited single-pass gain such as in a disc laser, or the limited pulse-duration in an excimer laser that would not allow for the evolution of the required USR mode. The result would be unsatisfactory transverse mode discrimination, as well as a low focusing quality due to the thin annular cross-section of the output beam. Success was obtained in the past using a large number of gain discs, and that implies a very high power of the laser.

Yet another way of reducing the Fresnel Number was utilizing intra-cavity W-Axicon [waxicon] elements as in large-diameter annular gain volumes such as the annular chemical lasers or annular RF-excited $CO_2$ lasers.

SUMMARY

There may be provided an improved optical laser resonators and amplifiers. According to the invention there is provided an optical configuration including axiconical elements that serve as parts of a resonator or an optical chain of an amplifier for an active laser volume with a large transverse dimension. The system may include a single-fold or multiple-folds axiconical elements. One of the system's advantages is providing the means to produce, even with a stable resonator, a high-quality and well-controlled beam, utilizing efficiently a wide active laser medium.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

There may be provided a laser system with a large-diameter active volume, with a very low-order transverse mode.

There may be provided a laser system that enables mode control to provide the best mode fit for specific applications.

There may be provided a low-order mode from such active volume, utilizing most of the whole active volume.

There may be provided a high accumulated gain from a single active volume element with a low-per-single-pass gain, thus achieving more freedom in the output coupling design, as well as higher laser energetic efficiency.

There may be provided a laser system with very low sensitivity to mechanical misalignments.

The laser system may include a stable resonator or an unstable resonator.

There are mentioned here two preferred embodiments, the solid state disc laser [hereafter: disc laser] and the excimer laser. A detailed description is given here for the disc laser, but those familiar with the art understand that other gain media may be suitable for the utilization of the invention.

A laser oscillator system may include a disc laser gain element, or multiple such elements, that act also as intra cavity folding mirror elements. These discs may be chemically, optically or mechanically, or by any combination thereof, prepared, and optically pumped, in the shape of concentric central circular or elliptical disc and adjacent annuli to reduce the unwanted ASE—amplified spontaneous emission—along the radial dimension of the gain volume, thus enabling larger-diameter gain discs. Radially changing level of pumping may be used also so as to match the intra-cavity intensity in each annular propagation part, for best pumping efficiency. At both sides of the wide-area gain medium there are provided, co-axially mounted, aligned and fitting the shape of the gain regions, respectively: an even-number-stage [two-, four-, six- etc. stage] waxicon on one side, a single [for a two-stage waxicon] or a multiple-stage axicon with a central hole and an out-coupling mirror, both on the other side of the resonator. The laser beam is folded and passed multiple times through the active gain medium, each time through a different annular segment, finally being compacted into a central cylindrical beam at the central stage of the waxicon, passed through the central disc of the gain region, passed through the central hole of the axicon and partially extracted from the resonator through the out-coupling mirror. The remaining part of the beam is returned by the partially reflective output coupling mirror into the resonator to continue the laser action. The length of the resonator, with the radial dimensions of the central stage of the waxicon and central gain disc, the adjacent annular stages, their radii of curvature and the radius of curvature of the out-coupling mirror are designed to provide a low Fresnel Number and the excitation of a low order transverse mode in the laser system. Additional passive mirrors may also be used for beam folding or as intra-cavity beam-expanders to facilitate matching between the size/shape of waxicon-axicon pairs and the size/shape of the amplifying disc [or discs]. The Fresnel Number equals $a^2/(\lambda*L)$—and defines the relations between the geometrical parameters and the diffraction in the resonator, thus indicating the capability to support low-order or high-order modes.

The out-coupling mirror may be evenly partially transparent.

It may also be halved, being about 100% reflective on one half and partially transparent over the other half.

The later, halved, configuration doubles the number of passes through the gain elements [but cumulatively the same area and volume], doubling the optical length of the resonator; at the same time, the transverse dimension of the compact beam is halved. In this configuration the Fresnel Number is effectively reduced by a factor between 4 and 8, thus improving on the capability to obtain a low order transverse mode in the laser system. Actually, a TEM01* mode is excited in the resonator, and only one half of it is out-coupled, which enables converting it into a "close-to-Gaussian" beam.

A derivative of this halved configuration may be implemented in the form of an unstable resonator, with the back [concave] mirror is placed instead of the 100% reflector, and a convex mirror with a "scraper" in its front or a graded-reflectivity convex mirror, each designed for best mode control and output coupling. The "scraper" mirror is an annular mirror that out-couples the external rim of the beam generated in the resonator, without the need for a partially-reflecting output mirror. The design for best mode control and output coupling may involve providing an unstable resonator where both output-coupling and mode properties are defined by the length of the resonator together with the radii of curvature of the mirrors and the size of the "scraper".

Another preferred embodiment is that of a laser amplifier.

In one amplifier embodiment the source beam is introduced into the amplifier through one half of the central cone of the waxicon, and after amplification—directed out of the amplifier through the second half.

In another amplifier embodiment there are provided, on both sides of the gain medium, reflaxicons [instead of the waxicon and axicon] with the central conical elements pointing in the opposite directions of the outer annuli, thus enabling an outer-source beam to enter the amplification chain and to exit it on the other side. The considerations regarding the mode control are different here, being reduced to control of the beam distortion along the amplification chain, as the input beam is controlled in the outer source.

Another embodiment is that of the oscillator, with a seeding laser beam being injected through a small hole in the center of the waxicon [via a fiber or other optical arrangement], thus enabling even further control of the oscillating mode in the transverse mode shape, wavelength and polarization, as well as in the time domain [pulsing, modulating etc.].

Yet another embodiment is one where an amplifying fiber, optically pumped, is provided as the active medium, with optical elements to couple the radiation to the waxicon-axicon resonator. This configuration provides yet another sort of capabilities to control the laser operation.

There may be provided an optical system that may include an axicon reflector having a center aperture; a waxicon reflector that has an even number of stages; an amplifying unit; an excitation unit that may be configured to excite the amplifying unit; wherein an optical axis of the waxicon reflector differs from an optical axis of the axicon reflector; wherein the optical axis of the waxicon reflector and the optical axis of the axicon reflector belong to a continuous folded optical path; wherein different stages of the waxicon reflector may be configured to reflect a laser beam, during different amplifying iterations, towards different regions of the amplifying unit; wherein some of the different regions of the amplifying unit may be configured to amplify the laser beam, during the different amplifying iterations, and direct the laser beam towards different regions of the axicon reflector; wherein one region of the amplifying unit may be configured to amplify the laser beam and direct the laser beam from the waxicon reflector through the center aperture of the waxicon; wherein different regions of the axicon reflector may be configured to reflect the laser beam, during the different amplifying iterations, towards the different regions of the amplifying unit; wherein the different regions of the amplifying unit may be configured to amplify the laser beam, during the different amplifying iterations, and direct the laser beam towards different regions of the waxicon reflector.

The different regions may be non-overlapping or partially overlapping. Different regions may have the same shape and/or size. Different regions may have different shape and/or size. The different regions may include a central circular region and multiple co-centric annular shaped regions. The different regions may have and different shapes and/or sizes.

The optical system may include an output mirror.

The optical system wherein the output mirror may belong to a stable resonator.

The optical system wherein the output mirror may belong to an unstable resonator.

The a first stage of the waxicon reflector may be configured to reflect a laser beam towards a first region of the first amplifying disc; wherein the first region of the amplifying unit may be configured to amplify the laser beam and direct the laser beam towards a first region of the axicon reflector; wherein the first region of the axicon reflector may be configured to receive the laser beam and reflect the laser beam towards a second region of the first amplifying disc; wherein the second region of the amplifying unit may be configured to amplify the laser beam and to direct the laser beam towards a second stage of the waxicon reflector.

The waxicon reflector and the axicon reflector may be positioned on opposite sides of an optical axis of the amplifying unit.

The optical axis of the waxicon reflector and the optical axis of the axicon reflector may be parallel to each other.

The optical axis of the waxicon reflector and the optical axis of the axicon reflector may be oriented at each other.

The number of stages of the waxicon reflector minus one may equal a number of stages of the axicon reflector.

A stages of the waxicon and the axicon may be configured to reflect the laser beam, during the different amplifying iterations.

The amplifying unit consists essentially of an amplifying and reflecting disc.

The different stages of the waxicon reflector may be configured to reflect the laser beam towards different regions of the amplifying disc; wherein some of the different regions of the amplifying disc may be configured to amplify the laser beam and direct the laser beam towards different regions of the axicon reflector; wherein one central region of the amplifying disc may be configured to amplify the laser beam and direct the laser beam from the waxicon reflector through the center aperture; wherein different regions of the axicon reflector may be configured to reflect the laser beam towards the different regions of the amplifying disc; and wherein the different regions of the amplifying disc may be configured to amplify the laser beam and direct the laser beam towards different regions of the waxicon reflector.

The amplifying unit may include a set of amplifying disks that may be configured to amplify the laser beam.

Each amplifying disk of the set may include multiple regions; wherein the amplifying unit may be configured to amplify the laser beam by utilizing, during the different amplifying iterations, at least a majority of the multiple regions of each of the multiplying disks.

The amplifying unit may be configured to amplify the laser beam by using all amplifying disks of the set during each one of the different amplifying iterations.

The set may include a first amplifying disc and a second amplifying disc; wherein the amplifying unit may include a first mirror, and a second mirror; wherein the different stages of the waxicon reflector may be configured to reflect the laser beam, during the different amplifying iterations, towards different regions of the first amplifying disc; wherein the different regions of the first amplifying disc may be configured to reflect the laser beam, during the different amplifying iterations, towards different regions of the first mirror; wherein the different regions of the first mirror may be configured to reflect the laser beam, during the different amplifying iterations, towards different regions of the second amplifying disc; and wherein the different regions of the second amplifying disc may be configured to reflect the laser beam, during the different amplifying iterations, towards different regions of the axicon reflector.

The upper half of the output mirror may be transmissive and a lower half of the output les may be reflective.

The optical system may include a seeding beam supply unit.

The seeding beam supply unit may be configured to provide a seeding beam through a central aperture in the central cone of the waxicon reflector.

The excitation unit may include laser diodes that may be configured to excite the amplifying disc.

There may be provided an optical system that may include an axicon reflector having a center aperture; a waxicon reflector that has an even number of stages; an output mirror; an amplifying unit; and an excitation unit that may be configured to excite the amplifying unit; wherein an optical axis of the waxicon reflector differs from an optical axis of the axicon reflector; wherein different stages of the waxicon reflector may be configured to reflect a laser beam, during different amplifying iterations, towards different regions of the amplifying unit; wherein some of the different regions of the amplifying unit may be configured to amplify the laser beam, during the different amplifying iterations, and direct the laser beam towards different regions of the axicon reflector; wherein one region of the amplifying unit may be configured to amplify the laser beam and direct the laser beam from the waxicon reflector through the center aperture of the axicon and through the output mirror; wherein different regions of the axicon reflector may be configured to reflect the laser beam, during the different amplifying iterations, towards the different regions of the amplifying unit; wherein the different regions of the amplifying unit may be configured to amplify the laser beam, during the different amplifying iterations, and direct the laser beam towards different regions of the waxicon reflector.

There may be provided an optical system that may include an axicon reflector having a center aperture; a waxicon reflector that has an even number of stages; and an amplifying disc; laser diodes that may be configured to excite the amplifying disc; wherein an optical axis of the waxicon reflector differs from an optical axis of the axicon reflector; wherein different stages of the waxicon reflector may be configured to reflect a laser beam towards different regions of the amplifying disc; wherein some of the different regions of the amplifying disc may be configured to amplify the laser beam and direct the laser beam towards different regions of the axicon reflector; wherein one region of the amplifying disc may be configured to amplify the laser beam and direct the laser beam from the waxicon reflector through the center aperture of the axicon; wherein different regions of the axicon reflector may be configured to reflect the laser beam towards the different regions of the amplifying disc; and wherein the different regions of the amplifying disc may be configured to amplify the laser beam and direct the laser beam towards different regions of the waxicon reflector The laser diodes may illuminate the amplifying disk, may directly or indirectly (via optics) illuminate the different regions of the amplifying dis. The laser diode may be positioned in any distance and/or location in relation to the amplifying disc.

Any reference to a system should be applied mutatis mutandis to a method for operating the system.

There may be provided a method that may include exciting, by an excitation unit, an amplifying unit of an optical system; reflecting, by different stages of a waxicon reflector of the optical system, a laser beam, during different amplifying iterations, towards different regions of an amplifying unit of the optical system; amplifying, by some of the different regions of the amplifying unit, the laser beam, during the different amplifying iterations, directing the laser beam towards different regions of an axicon reflector of the optical system; amplifying, by one region of the amplifying unit, the laser beam and directing the laser beam from the waxicon reflector through a center aperture of the axicon reflector; wherein an optical axis of the waxicon reflector differs from an optical axis of the axicon reflector; wherein the optical axis of the waxicon reflector and the optical axis of the axicon reflector belong to a continuous folded optical path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
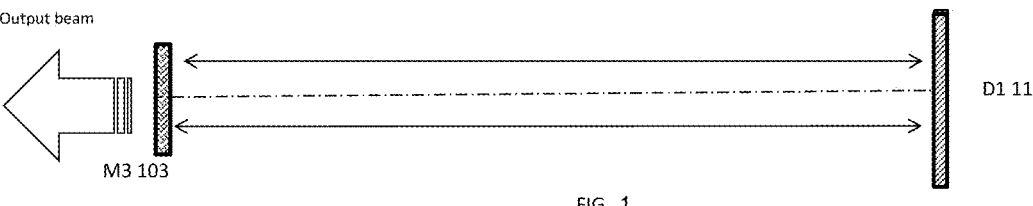
FIG. 1 illustrates a prior art system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic and/or optical components and circuits known to those skilled in the art, details will not be explained in any greater extent than that considered necessary as illustrated above, for the understanding and appreciation of the underlying concepts of the present invention and in order not to obfuscate or distract from the teachings of the present invention.

FIG. 1 is a schematic description of a public domain disc laser in a simple linear stable resonator configuration. The pumping and cooling arrangements of the disc element are not shown here and hereafter for simplicity. D1 11 is a thin-disc amplifying element with a fully reflective mirror on its rear side. M3 13 is an output-coupling mirror. The same nomenclature holds for the following figures as well.

Figure 2:
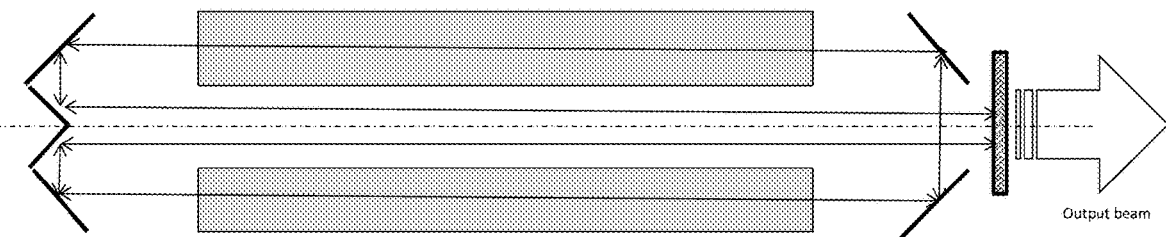
FIG. 2 illustrates a prior art system.

FIG. 2 is a previously published description of a waxicon-axicon [M1 11 and M2 12 respectively] resonator implemented in a $CO_2$ laser with an annular active volume. The beam is radially folded and passed through the annular active volume and central elements, and finally out coupled through the coupling mirror M3 13.

Figure 3:
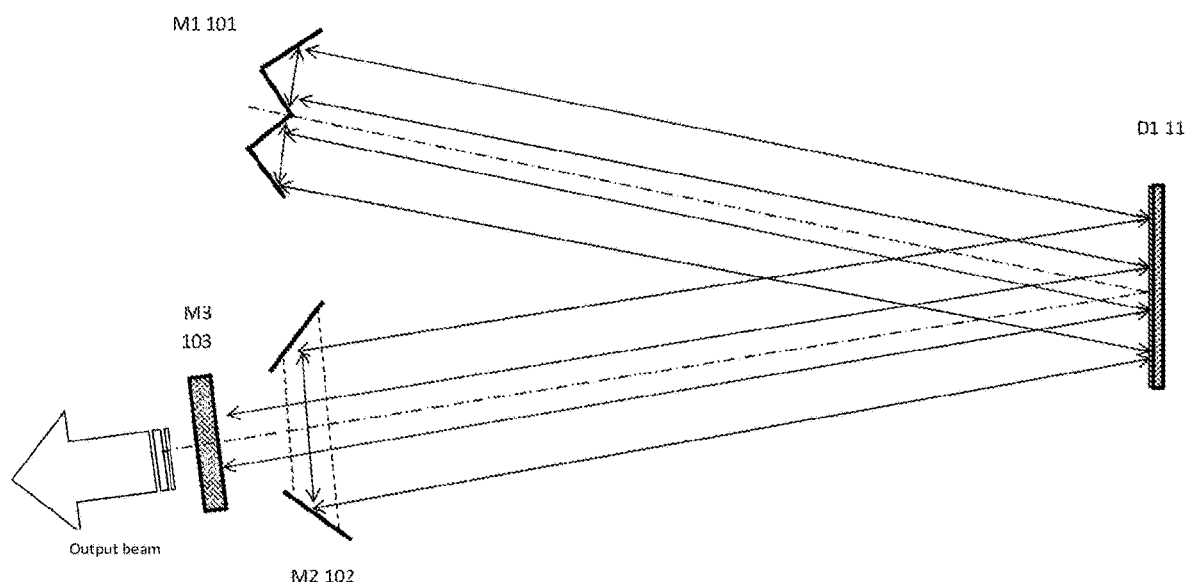
FIG. 3 illustrates an example of a system.

FIG. 3 is a schematic description of a single even waxicon M1 11 and axicon M2 12 resonator implemented in the embodiment of a disc laser with an amplifying disc D1. The beam is radially folded and passed through the active volume annular and central elements, and is reflected by the rear surface of the disc, and finally out coupled through the coupling mirror M3. There may be more than one active laser disc in the resonator, or additional passive mirrors, folding the resonator.

Figure 4A:
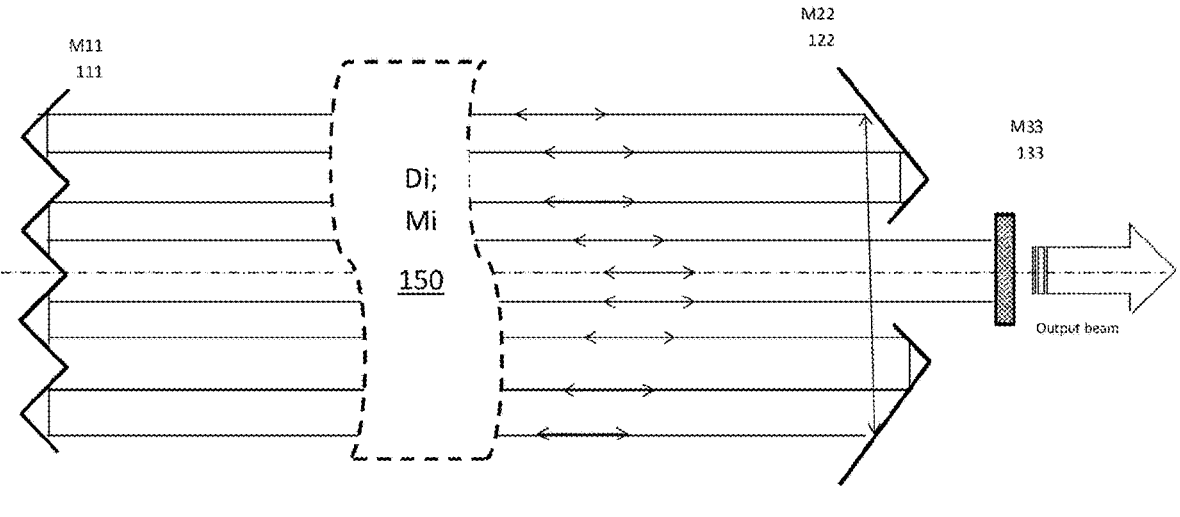
FIG. 4A illustrates an example of a system.

FIG. 4A is a schematic description of a multiple even waxicon M11 111 and axicon M22 122 resonator implemented in the embodiment of a disc laser. The multiple even waxicon may have more pairs of conical folding surfaces than depicted in the figure, and corresponding folding conical surfaces in the axicon M22 122.

There may be more than one active laser disc Di in the resonator, or additional passive mirror(s) Mi, folding the resonator. A module that include one or more laser disks and one or more mirrors is denoted Di, Mi 150.

The additional passive mirrors, as well as appropriate curvatures in the conical surfaces of M1 1 111 and M22 122, may also be used as intra-cavity beam-expanders to facilitate matching between the size/shape of waxicon-axicon pairs and the size/shape of the amplifying disc [or discs]. The same statements hold for all the figures herein. The beam is radially folded and passed through the active volume annular and central elements, and is reflected by the rear surface of the disc(s) Di, and finally out coupled through the coupling mirror M33 133.

Figure 4B:
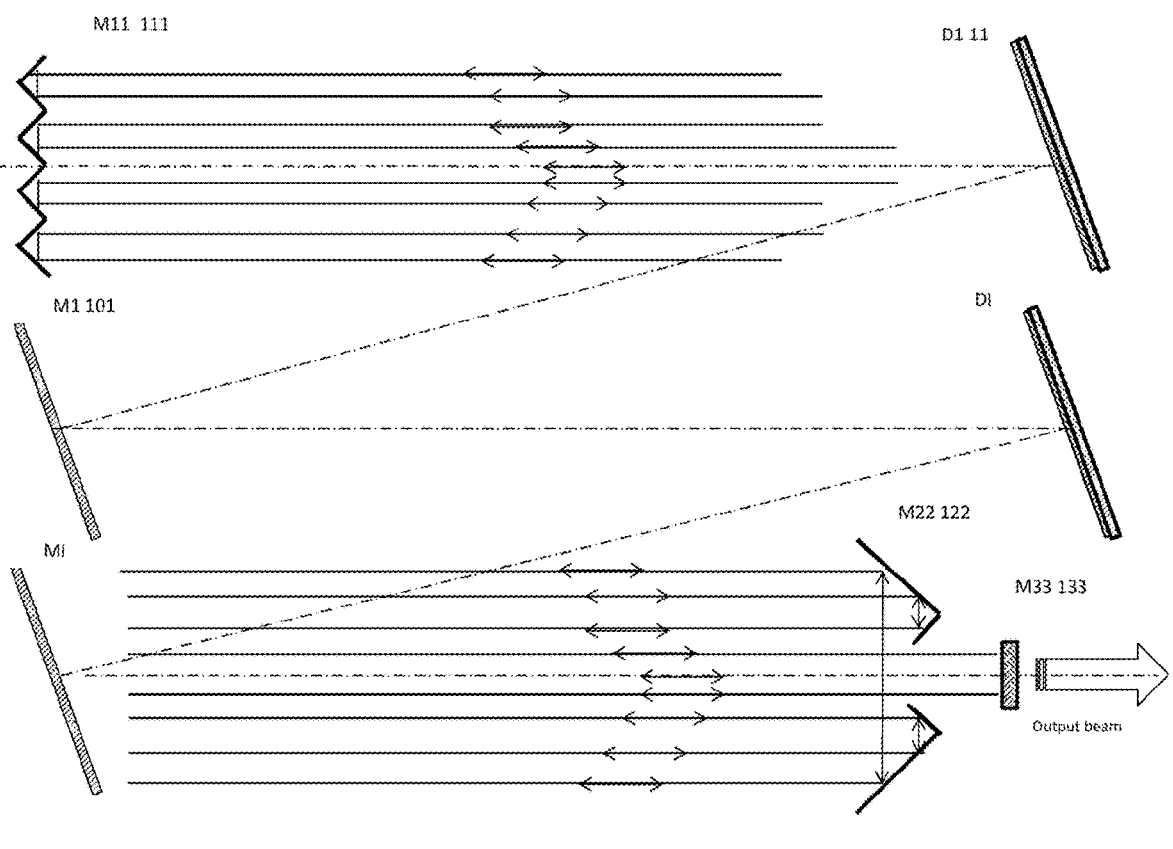
FIG. 4B illustrates an example of a system.

FIG. 4B is an explanatory presentation of the folding principle mentioned for FIG. 4A above. The optical folding of the resonator may be performed using amplifying discs or mirrors.

Figure 4C:
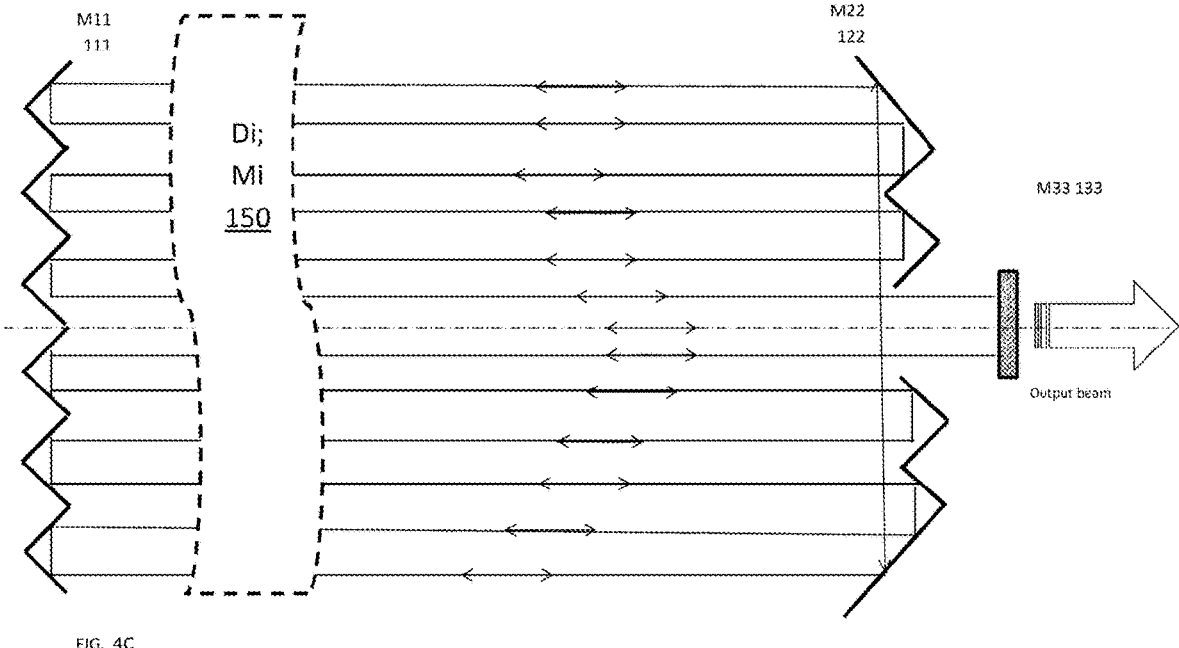
FIG. 4C illustrates an example of a system.

FIG. 4C, along with the former figures, depicts graphically the relation between the number of stages of the axicon and the number of stages of the waxicon. It follows that the number of axicon stages is as that of the waxicon, without/except the central cone of the waxicon.

Figure 5:
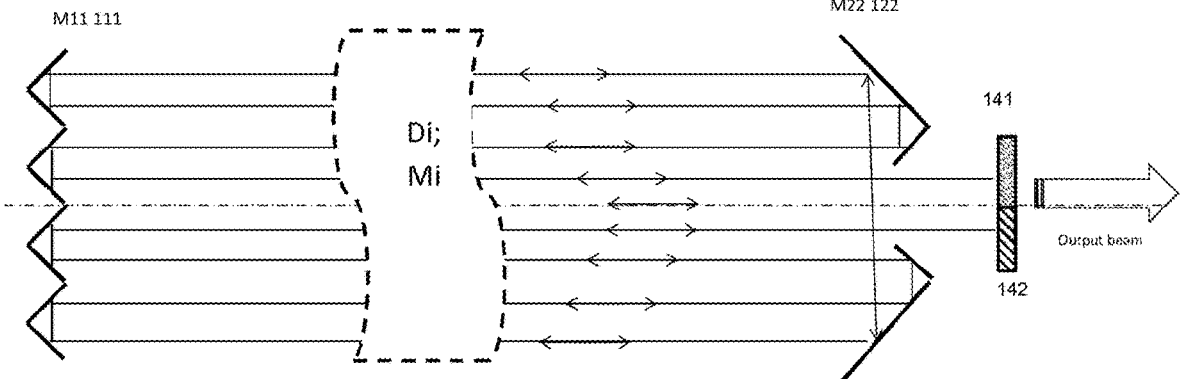
FIG. 5 illustrates an example of a system.

FIG. 5 is a schematic description of a multiple even waxicon M11 111 and axicon M22 122 resonator implemented in the embodiment of a disc laser. The beam is radially folded and passed through the active volume annular and central elements, and is reflected by the rear surface of the disc(s) Di, and finally out coupled through half 141 of the coupling mirror. The mirror is "halved" through its diameter such that one half 142 is fully [100% ideally] reflecting, and the second half 141 is partially reflective [PR] according to the output coupling requirements of this resonator. There may be more than one active laser disc in the resonator, or additional passive mirrors, folding the resonator. In this arrangement the resonator, with proper design, supports a mode in the shape of TEM10*, half of which is out-coupled through the mirror.

Figure 6:
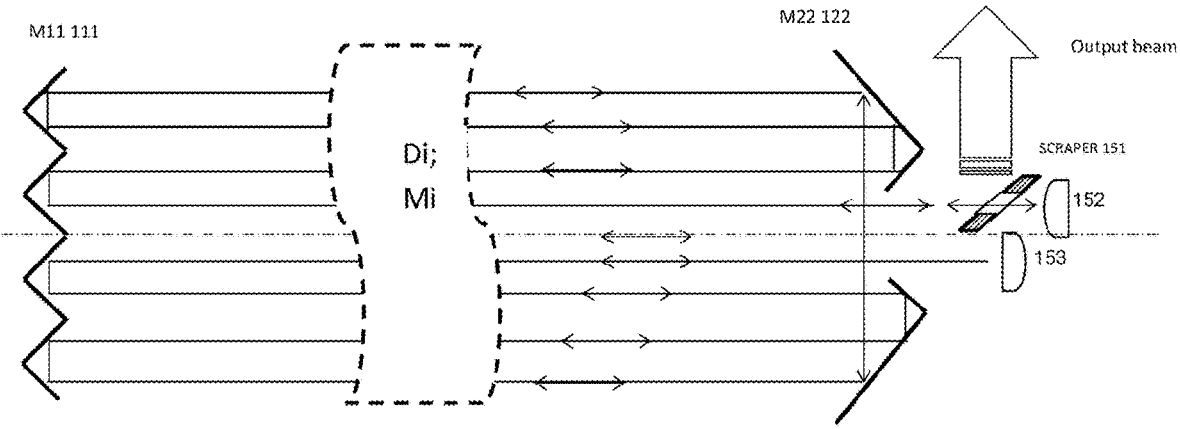
FIG. 6 illustrates an example of a system.

FIG. 6 depicts a similar arrangement as FIG. 5, except that in this figure the resonator is of the Unstable Resonator configuration, the concave mirror 152 and the convex mirror 153 acting as the end-mirrors, and the out-coupling is done with a scrapper mirror 151.

An alternative coupling method can be without the scrapper, with the convex mirror 153 being a gradial-reflectivity mirror [such as but not limited to a Gaussian or a super-Gaussian mirror].

Figure 7A:
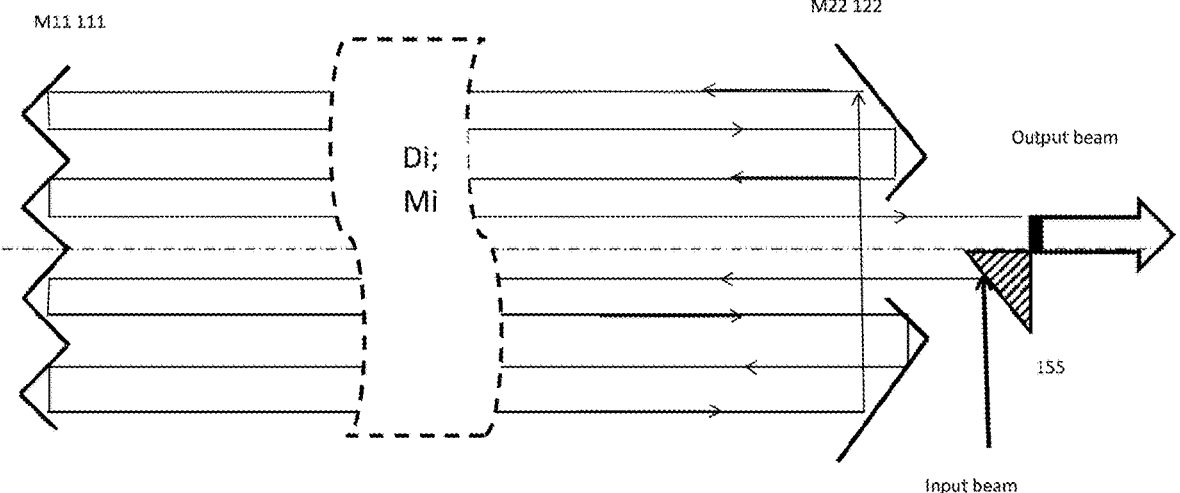
FIG. 7A illustrates an example of a system.

FIG. 7A is a schematic description of a multiple even waxicon M11/axicon M22 amplifier implemented in the embodiment of a disc laser. The beam is introduced into the amplifier from an external source via the folding mirror 155, then radially folded and passed through the active volume annular and central elements, and is reflected by the rear surface of the disc(s) Di, and finally out coupled with or without another folding mirror [the other folding mirror not shown in the figure]. There may be more than one active laser disc in the resonator, or an additional passive mirror, folding the amplifier.

Figure 7B:
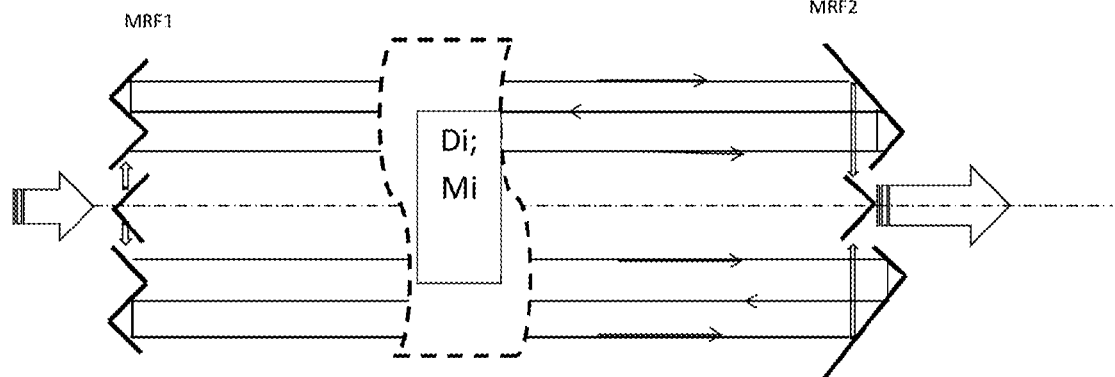
FIG. 7B illustrates an example of a system.

FIG. 7B is a schematic description of a multiple even reflaxicons MRF1/MRF2 amplifier implemented in the embodiment of a disc laser. The beam is introduced into the amplifier from an external source via the central cone of MRF1, then radially folded by the external parts of MRF1 and MRF2 and passed through the active volume annular elements, and is reflected by the rear surface of the disc(s) Di, and finally out coupled with the central cone of MRF2. There may be more than one active laser disc in the resonator, or additional passive mirrors, folding the amplifier.

Figure 8:
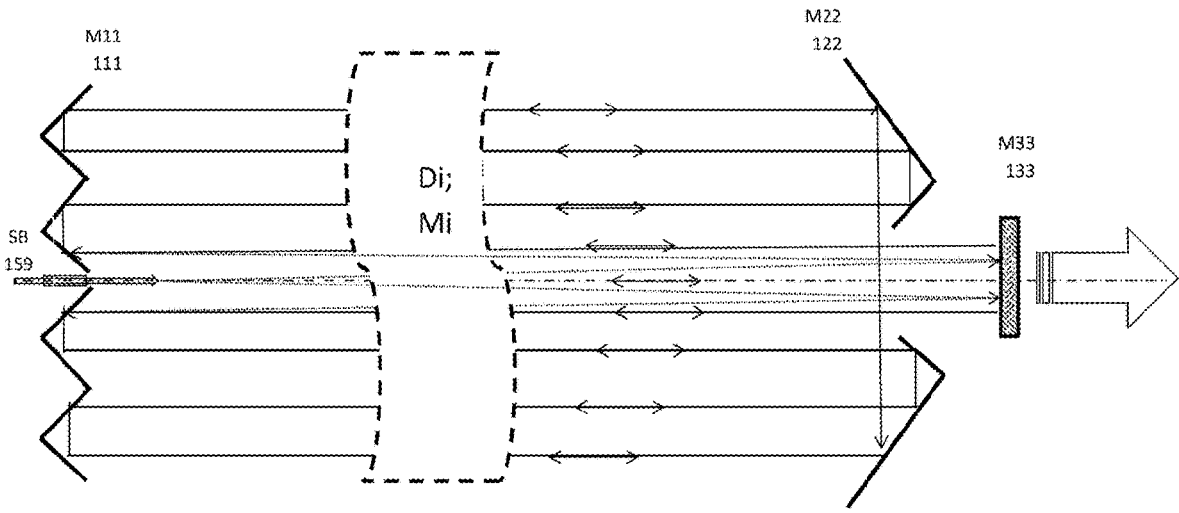
FIG. 8 illustrates an example of a system.

FIG. 8 illustrates a system in which a seeding beam SB 159 is introduced through a small aperture at the center of the central cone of the waxicon M1 or M11 respectively. There may be more than one active laser disc in the resonator, or an additional number of passive mirrors, folding the resonator. The diameter of the seed beam is small so as to ensure diffractive spread allowing the reflection from the output coupler M3 to expand and fill the resonator via the reflections from the waxicon and axicon.

Figure 9:
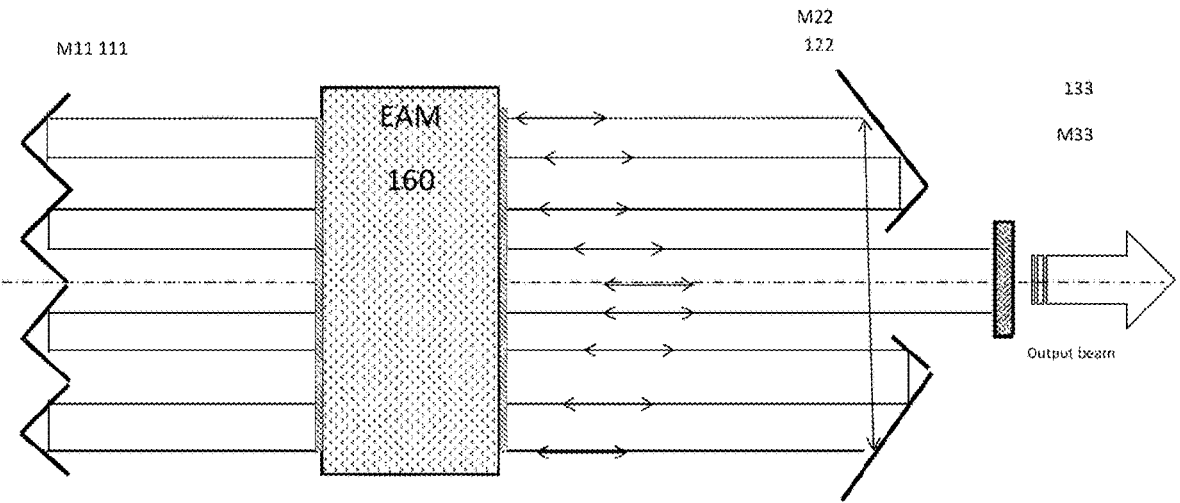
FIG. 9 illustrates an example of a system.

FIG. 9 is a schematic description of a system that includes an Excimer Amplifying Module (denoted EAM 160) that is optically pumped and is provided as the active medium, with optical elements to couple the radiation to the waxicon-axicon resonator. This configuration provides yet another sort of capabilities to control the laser operation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

There may be provided a laser system providing a stable low-order mode output beam, said system having low sensitivity to opto-mechanical misalignments may include an active volume that may have large transversal dimensions such as, but not limited to, a solid state laser single or multiple disc amplifier; means (such as laser diodes) of exciting said active volume or volumes in a cylindrically symmetric shape to provide optical gain for laser action; means of cooling (such as water flowing behind the back [reflecting] side of the amplifying disc) said volume or volumes; a stable or an unstable resonator that may include an even-stage reflective annular axiconical end mirror, a corresponding-stage-number waxiconical reflector and a partially transmitting concave output coupling mirror, said resonator being co-axial and optically aligned with said active volume which in the case of a solid-state laser disc amplifier acts also as a folding element in said resonator, said resonator producing a low-transverse-order single mode output beam; said annular axicon, waxicon and partially transmitting mirror having radial curvatures designed for the supporting of said single mode beam; the stages of said waxicon and axicon being annuli of radial widths either equal to each other or designed for best distribution of the intra-cavity power density flux (controlling the mirror heating and/or gain saturation in the active medium) and low-transverse-mode support (by further controlling the Fresnel Number in the various sections of the resonator); mirrors acting as additional optical folding elements in said resonator; wherein all the optical chain elements of said resonator designed, mounted and aligned to ensure the production of the said desired low-transverse-mode output beam.

The laser system may produce said output beam from said active volume with an improved efficiency, by better utilizing the cumulative gain from the multiple passes through the active medium which may have a low single-pass gain.

Annular optically-attenuating rings may be introduced in the active volume according to the geometry of the waxicon mirror, in between the folding conical rings, to reduce the amplified spontaneous emission in the radial direction.

The output coupling mirror may be half diametrally fully reflective and half partially transmitting.

The laser system may be configured as an amplifier having staged reflaxicons introduced instead of the axicon, waxicon and output coupling mirror.

The laser system may act as an amplifier having input and output optical folding and/or transmitting arrangement instead of the output coupling mirror.

The laser system may receive a seeding laser beam through an opening at the tip of the central cone of said waxicon to influence the oscillating mode shape or polarization or frequency or time-modulation or any combination of the above. The laser may be induced to oscillate at a chosen wavelength, polarization, timing and/or mode shape. In the current example the seeding beam is introduced via a hole in the tip of the waxicon.

The pumping (the excitation) of the active volume is homogeneous.

The pumping of the active volume is not homogeneous to produce improved output beam quality and/or power.

An electro-optical modulation means may be introduced in the path of the central beam to enable short and ultra-short laser pulse generation.

The radial folding mirror elements may be a pair of a single stage waxicon and a single stage axicon.

The terms "including", "comprising", "having", "consisting" and "consisting essentially of" are used in an interchangeable manner. For example—any module may include at least the components included in the figures and/or in the specification, only the components included in the figures and/or the specification.

Any reference to the phrases "may" or "may be" should be applied to the phrases "may not" or "may not be".

The phrase "and/or" means additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between components are merely illustrative and that alternative embodiments may merge components or impose an alternate decomposition of functionality upon various components. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. An optical system that comprises:
an axicon reflector having a center aperture;
a waxicon reflector that has an even number of stages;
an amplifying unit;
an excitation unit that is configured to excite the amplifying unit; and
an output mirror; wherein only an upper half of the output mirror is partially transmissive and only a lower half of the output mirror is fully reflective;
wherein an optical axis of the waxicon reflector differs from an optical axis of the axicon reflector;
wherein the optical axis of the waxicon reflector and the optical axis of the axicon reflector belong to a continuous folded optical path;
wherein different stages of the waxicon reflector are configured to reflect a laser beam, during different amplifying iterations, towards different regions of the amplifying unit;
wherein some of the different regions of the amplifying unit are configured to amplify the laser beam, during the different amplifying iterations, and direct the laser beam towards different regions of the axicon reflector;
wherein one region of the amplifying unit is configured to amplify the laser beam and direct the laser beam from the waxicon reflector through the center aperture;
wherein different regions of the axicon reflector are configured to reflect the laser beam, during the different amplifying iterations, towards the different regions of the amplifying unit;
wherein the different regions of the amplifying unit are configured to amplify the laser beam, during the different amplifying iterations, and direct the laser beam towards different regions of the waxicon reflector.

2. The optical system according to claim 1 wherein the output mirror belongs to a stable resonator.

3. The optical system according to claim 1 wherein the output mirror belongs to an unstable resonator.

4. The optical system according to claim 1 wherein a first stage of the waxicon reflector is configured to reflect a laser beam towards a first region of the first amplifying disc; wherein the first region of the amplifying unit is configured to amplify the laser beam and direct the laser beam towards a first region of the axicon reflector; wherein the first region of the axicon reflector is configured to receive the laser beam and reflect the laser beam towards a second region of the first amplifying disc; wherein the second region of the amplifying unit is configured to amplify the laser beam and to direct the laser beam towards a second stage of the waxicon reflector.

5. The optical system according to claim 1 wherein the waxicon reflector and the axicon reflector are positioned on opposite sides of an optical axis of the amplifying unit.

6. The optical system according to claim 1 wherein the optical axis of the waxicon reflector and the optical axis of the axicon reflector are parallel to each other.

7. The optical system according to claim 1 wherein the optical axis of the waxicon reflector and the optical axis of the axicon reflector are oriented at each other.

8. The optical system according to claim 1 wherein a number of stages of the waxicon reflector minus one equals a number of stages of the axicon reflector.

9. The optical system according to claim 1 wherein all stages of the waxicon and the axicon are configured to reflect the laser beam, during the different amplifying iterations.

10. The optical system according to claim 1 wherein the amplifying unit consists essentially of an amplifying and reflecting disc.

11. The optical system according to claim 10 wherein the different stages of the waxicon reflector are configured to reflect the laser beam towards different regions of the amplifying and reflecting disc; wherein some of the different regions of the amplifying and reflecting disc are configured to amplify the laser beam and direct the laser beam towards different regions of the axicon reflector; wherein one central region of the amplifying and reflecting disc is configured to amplify the laser beam and direct the laser beam from the waxicon reflector through the center aperture; wherein different regions of the axicon reflector are configured to reflect the laser beam towards the different regions of the amplifying and reflecting disc; and
wherein the different regions of the amplifying and reflecting disc are configured to amplify the laser beam and direct the laser beam towards different regions of the waxicon reflector.

12. The optical system according to claim 1 wherein the amplifying unit comprises a set of amplifying and reflecting discs that are configured to amplify the laser beam.

13. The optical system according to claim 12 wherein each amplifying and reflecting disc of the set comprises multiple regions; wherein the amplifying unit is configured to amplify the laser beam by utilizing, during the different amplifying iterations, at least a majority of the multiple regions of each of the amplifying and reflecting discs.

14. The optical system according to claim 12 wherein the amplifying unit is configured to amplify the laser beam by using all amplifying and reflecting discs of the set during each one of the different amplifying iterations.

15. The optical system according to claim 12 wherein the set comprises a first amplifying and reflecting disc and a second amplifying and reflecting disc; wherein the amplifying unit further comprises a first mirror, and a second mirror; wherein the different stages of the waxicon reflector are configured to reflect the laser beam, during the different amplifying iterations, towards different regions of the first amplifying and reflecting disc; wherein the different regions of the first amplifying and reflecting disc are configured to reflect the laser beam, during the different amplifying iterations, towards different regions of the first mirror; wherein the different regions of the first mirror are configured to reflect the laser beam, during the different amplifying iterations, towards different regions of the second amplifying and reflecting disc; and wherein the different regions of the second amplifying and reflecting disc are configured to reflect the laser beam, during the different amplifying iterations, towards different regions of the axicon reflector.

16. The optical system according to claim 1 further comprises a seeding beam supply unit.

17. The optical system according to claim 16 wherein the seeding beam supply unit is configured to provide a seeding beam through a central aperture of the waxicon reflector.

18. The optical system according to claim 1 wherein the excitation unit comprises laser diodes that are configured to excite the amplifying and reflecting disc.

19. The optical system according to claim 1 wherein amplifying unit comprises mirrors and amplifying and reflecting discs; wherein the mirrors are parallel to the amplifying and reflecting discs and have optical axes that are oriented to the optical axis of the waxicon reflector and are oriented to the optical axis of the axicon reflector; wherein the mirrors are positioned at one side of the optical system and the amplifying and reflecting discs are positioned at an opposite side of the optical system.

20. The optical system according to claim 1 comprising an unstable resonator, wherein the unstable resonator comprises a concave mirror, a convex mirror and a scrapper mirror, wherein an optical axis of each one of the concave mirror and the convex mirror is parallel to the optical axis of the waxicon reflector.

21. The optical system according to claim 1 comprising a folding reflecting mirror, that is configured to direct a laser beam, through a lower part of the central aperture of the axicon, towards the lower half of a central cone of the waxicon reflector, to be reflected multiple times and be reflected by an upper part of the central cone of the waxicon reflector through an upper part of the central aperture of the axicon.

22. The optical system according to claim 1 further comprising (a) a seeding beam supply unit is configured to provide a seeding beam through a central aperture of the waxicon reflector.

23. The optical system according to claim 1 comprising an unstable resonator, wherein the unstable resonator comprises a concave mirror and a convex mirror that is a gradial-reflectivity mirror; wherein an optical axis of each one of the concave mirror and the convex mirror is parallel to the optical axis of the waxicon reflector.

24. A method, comprising:

exciting, by an excitation unit, an amplifying unit of an optical system;

reflecting, by different stages of a waxicon reflector of the optical system, a laser beam, during different amplifying iterations, towards different regions of an amplifying unit of the optical system;

amplifying, by some of the different regions of the amplifying unit, the laser beam, during the different amplifying iterations;

directing the laser beam towards different regions of an axicon reflector of the optical system;

amplifying, by one region of the amplifying unit, the laser beam and directing the laser beam from the waxicon reflector through a center aperture of the axicon reflector;

wherein an optical axis of the waxicon reflector differs from an optical axis of the axicon reflector;

wherein the optical axis of the waxicon reflector and the optical axis of the axicon reflector belong to a continuous folded optical path; and wherein the optical system further comprises an output mirror, wherein only an upper half of the output mirror is partially transmissive and only lower half of the output mirror is fully reflective.

* * * * *